United States Patent Office 3,421,903
Patented Jan. 14, 1969

3,421,903
PROCESS FOR IMPROVING THE TENDERNESS, COLOR AND RICHNESS OF MEAT
Beverly E. Williams, 716 N. La Grange Road, La Grange Park, Ill. 60525
No Drawing. Filed Dec. 2, 1965, Ser. No. 511,236
U.S. Cl. 99—107
Int. Cl. A23l 3/34
1 Claim

ABSTRACT OF THE DISCLOSURE

An aqueous solution containing gelatin, a proteolytic enzyme, and a buffer for the enzyme is stitch pumped into the muscles of freshly slaughtered animals. The buffer is sugar or sodium chloride or a mixture of sugar and sodium chloride and the temperature of the solution is from 100° F. to 140° F.

---

This invention relates to processes for improving the tenderness, color and richness of meat and more particularly to such processes which are performed upon the killing floor while the carcass is still warm and flaccid and prior to the completion of rigor mortis.

In my pending application, filed Aug. 19, 1965, Ser. No. 481,062 and titled "Process for Improving the Color and Richness of Meat," I disclose and claim a process in which an aqueous solution containing gelatin is added in the muscle portion of the meat by multiple entry injection in amount of about 3% by weight under pressures of from 30 to 110 pounds per square inch and at temperatures of approximately 140° F. to 212° F., in which the gelatin minimizes oxidation of the myoglobin and the higher temperatures of the solution improves the color and brightens the red meat.

In my joint patent with Ben F. Buchanan, No. 2,805,163 of Sept. 3, 1957, processes are described utilizing an aqueous solution of an enzyme and additives which solution is stitch pumped into the carcass on the killing floor while the carcass is still warm and flaccid at temperatures in the range of about 100° F. to about 120° F. to improve the tenderness and flavor of the meat. This patent states that the injection fluid may have incorporated therein additives such as gelatin and others including monosodium glutamate.

Attempts to inject into meat an aqueous solution containing gelatin and a proteolytic enzyme, as suggested in my joint patent referred to above, developed that the enzyme preferentially attacked the gelatin and reduced the gelatin in the meat to a watery and slimy mass which prevented the enzyme from exerting any tenderizing effect upon the meat. The resulting meat was unfit for sale because of its generally poor condition. In fact, it has now become the standard test for enzyme potency to determine the amount a proteolytic enzyme will digest of a given amount of gelatin. This is known as the Standard Viscosity Method of Assay. See Journal of American Leather Chemists Association, vol. 47, p. 165 (1952).

As I have disclosed in my prior patents, aqueous solutions of proteolytic enzymes injected into meat to tenderize the meat must be kept at temperatures below 140° F. since higher temperatures inactivate the enzymes. It is also known from my prior patents that among the proteolytic enzymes ficin, bromelin and papain are suitable for the tenderizing of meats with papain more effective on the muscle fibers while ficin and bromelin are probably to be preferred as they are more effective in their action upon the insoluble, fibrous proteins made up of collagen and elastin, or connective tissues, which are albuminoids, than upon the soluble protein fraction of the muscle fibers.

Heretofore, efforts to inject proteolytic enzymes and gelatin in aqueous solution into a carcass, while still warm and flaccid and before the completion of rigor mortis, to tenderize the meat and to make it more firm have failed, although the enzymes and gelatin are compatible in the dry state, because, as noted above, when gelatin and proteolytic enzyme are put into aqueous solution and injected into the carcass, the enzyme attacks the gelatin and digests the gelatin before the enzyme attacks the meat.

I have now, and most unexpectedly, found that the action of the enzyme in aqueous solution can be buffered or temporarily arrested and prevented from preferentially attacking the gelatin by the adding of a preservative salt and/or a preservative sugar in the aqueous solution. The added buffer, either salt or sugar or both, protects the gelatin so that the gelatin is not reduced to a slime in the meat. The gelatin retains its consistency in the meat and traps any surplus water or moisture within the meat thus improving the color and richness of the meat. The enzyme, while buffered in its action upon the gelatin, is not buffered in its action upon the elastin, collagen or protein of the meat. The enzyme acts to soften or tenderize the connective tissue and the muscle bundle fibers of the meat so that the resulting product, when cooked, is a more tender and not a slimey piece of meat.

In tests which I have conducted with such an aqueous solution containing from 1 to 3 ounces of gelatin per gallon of water, proteolytic enzyme of potency of from 20 to 100 H.U. and buffering salt and/or sugar in amounts of from 2 to 6 ounces per gallon, injection pressures of from 30 to 110 pounds per square inch were used with the preferred pressure being from 40 to about 100 pounds per square inch and solution temperatures ranged from animal body temperature of about 100° F. to not over 140° F. so as not to inactivate the enzyme while using as high temperatures as possible to improve the color of the meat. Amounts of this aqueous solution of from approximately 2½ to 3% of the weight of the carcass beef were stitch pumped into the muscle bundle fibers of the carcass at the pressures and temperatures indicated.

It is therefore the object of the present invention to provide a novel process for improving the tenderness, color and richness of meat by stitch pumping into the meat an aqueous solution containing gelatin and a proteolytic enzyme with the proteolytic enzyme buffered in its action upon the gelatin by the addition to the solution of a protective salt and/or sugar.

As illustrative of a preferred process in accordance with the present invention, a beef carcass weighing approximately 600 pounds dressed was split into sides on the killing floor, scribe sawed and while still warm and flaccid and before the completion of rigor mortis, one side thereof weighing approximately 300 pounds was stitch pumped at a pressure of about 50 pounds per square inch into the muscle portion thereof by multiple entry injection with about four quarts of an aqueous solution containing 1 ounce of pure pork skin gelatin; 40 H.U. of proteolytic enzymes, one ounce of powdered corn syrup sugar; and one ounce of finely powdered pure salt (sodium chloride), the solution having a temperature of approximately 120° F. The treated side of the beef and the other or control side were then weighed and the treated side showed a gain in weight of about 2¾% which correlated with the weight of the aqueous solution pumped into that side. The sides were then allowed to hang for seven days in a conventional meat cooler. The treated side and the control side were then cut into wholesale and retail pieces and the corresponding pieces carefully inspected by skilled butchers and beef men.

The red meat of the treated side was brighter and lighter in color than that of the control side and the cut meat surfaces of the treated side had better appearance, better feel to the touch and were firmer and plumper than those of the control side in the unanimous opinions of the expert meat buyers and butchers who inspected the cuts of meat.

Retail pieces of the treated side and corresponding pieces of the control side were then subjected to organoleptic testing by a panel. The cooked pieces of the treated side were uniformly considered by the panel to be more tender than the corresponding cooked pieces of the control side.

A similar carcass was halved and one side was stitched pumped with an aqueous solution, as described above, containing two ounces of sugar, and no salt, to buffer the action of the proteolytic enzyme and at approximately the same temperatures and pressures as described above. The sides were then allowed to hang for seven days in a conventional meat cooler and were then cut into wholesale and retail pieces which pieces were carefully inspected as above and were then subjected to organoleptic testing. It was found that the sugar buffered the action of the enzyme in the meat so that the gelatin was not preferentially digested and that the treated meat was brighter and lighter in color than the control side, the cut meat surfaces of the treated side having better appearance, better feel to the touch and being firmer and plumper than those of the control side. The organoleptic tests showed that the treated cooked cuts of meat were more tender than the corresponding cooked cuts of the control half.

A similar carcass was halved and one side was stitched pumped with a similar aqueous solution containing proteolytic enzymes and gelatin with the proteolytic enzyme buffered in its action upon the gelatin by 2 ounces of salt (sodium chloride) only and no sugar. This aqueous solution was stitched pumped at temperatures and pressures as above described and the two halves were hung in a meat cooler as above and were then cut into wholesale and retail pieces. The corresponding pieces were carefully inspected by skilled butchers and beef men. Again, the red meat of the treated side was brighter and lighter in color than that of the control side and the cut meat surfaces of the treated side had better appearance, better feel to the touch and were firmer and plumper than those of the control side. Organoleptic testing of cooked pieces of the treated side and corresponding cooked pieces of the control side resulted in a uniform opinion by the panel that the cooked pieces of the treated side were more tender than the corresponding cooked pieces of the control side indicating that the proteolytic enzyme had been suitably buffered in its action upon the gelatin but had exerted its tenderizing effect upon the meat.

The taste panel found that the treated meat in the examples above when cooked was richer and of improved flavor compared to the corresponding control.

It is to be concluded from the results of the processes discussed above that the gelatin distributed through the meat protects the muscle myoglobin from oxidation upon exposure to air thus retaining the bright color of the meat in the wholesale and retail cuts thereof while the enzyme, buffered in its action upon the gelatin by the added salt or sugar or salt and sugar, acts upon the collagen or protein of the meat during cooking to provide a more tender piece of meat when cooked. It is entirely unexpected that these results should be obtained from an aqueous gelatin solution containing an enzyme since heretofore such solutions when stitched pumped into meat digested the gelatin, thus preventing it from firming or solidifying and produced in the meat a watery slime because of the preferential digestion of the gelatin by the enzyme. When the meat is cooked, the heat dissolves the gelatin and activates the enzyme to attack the collogen, elastin and protein thus tenderizing the meat during the cooking process.

It should now be apparent to those skilled in the art that the present invention in every way satisfies the objective discussed above.

Changes in or modifications to the above described illustrated processes may now be suggested without departing from the present inventive concept and reference should therefore be had to the appended claims to determine the scope of this invention.

What is claimed is:

1. In a method for improving the tenderness, color and richness of meat, the step of adding an aqueous solution containing gelatin, proteolytic enzyme and a buffer for the proteolytic enzyme in the muscle portion of the meat while still warm and flaccid and prior to rigor mortis by multiple entry injection of about 3% aqueous solution by weight under pressure from 30 to 110 pounds per square inch at a temperature of approximately 100° F. to 140° F. directly into the muscle of freshly slaughtered animals whereby the red color of the meat is lightened and brightened and oxidation of the myoglobin is minimized with improved tenderness of the meat when cooked, the amount of gelatin in the aqueous solution ranging from 1 to 3 ounces per gallon thereof, the potency of the proteolytic enzyme ranging from 20 H.U. to 100 H.U. per gallon thereof and the buffer being selected from a group consisting of sugar, sodium chloride and sugar and sodium chloride, the amount of buffer in the aqueous solution approximating 2 to 6 ounces per gallon thereof.

References Cited

UNITED STATES PATENTS

| 2,999,020 | 9/1961  | Williams | 99—107 |
| 3,006,768 | 10/1961 | Williams | 99—107 |
| 3,156,566 | 11/1964 | Williams | 99—107 |
| 3,119,696 | 1/1964  | Williams | 99—107 |
| 3,122,440 | 2/1964  | Williams | 99—107 |

HYMAN LORD, *Primary Examiner.*